Aug. 8, 1939.　　　　J. A. JOHANSON　　　　2,169,149
DOUBLE-ACTING WIND TURBINE
Filed June 11, 1938
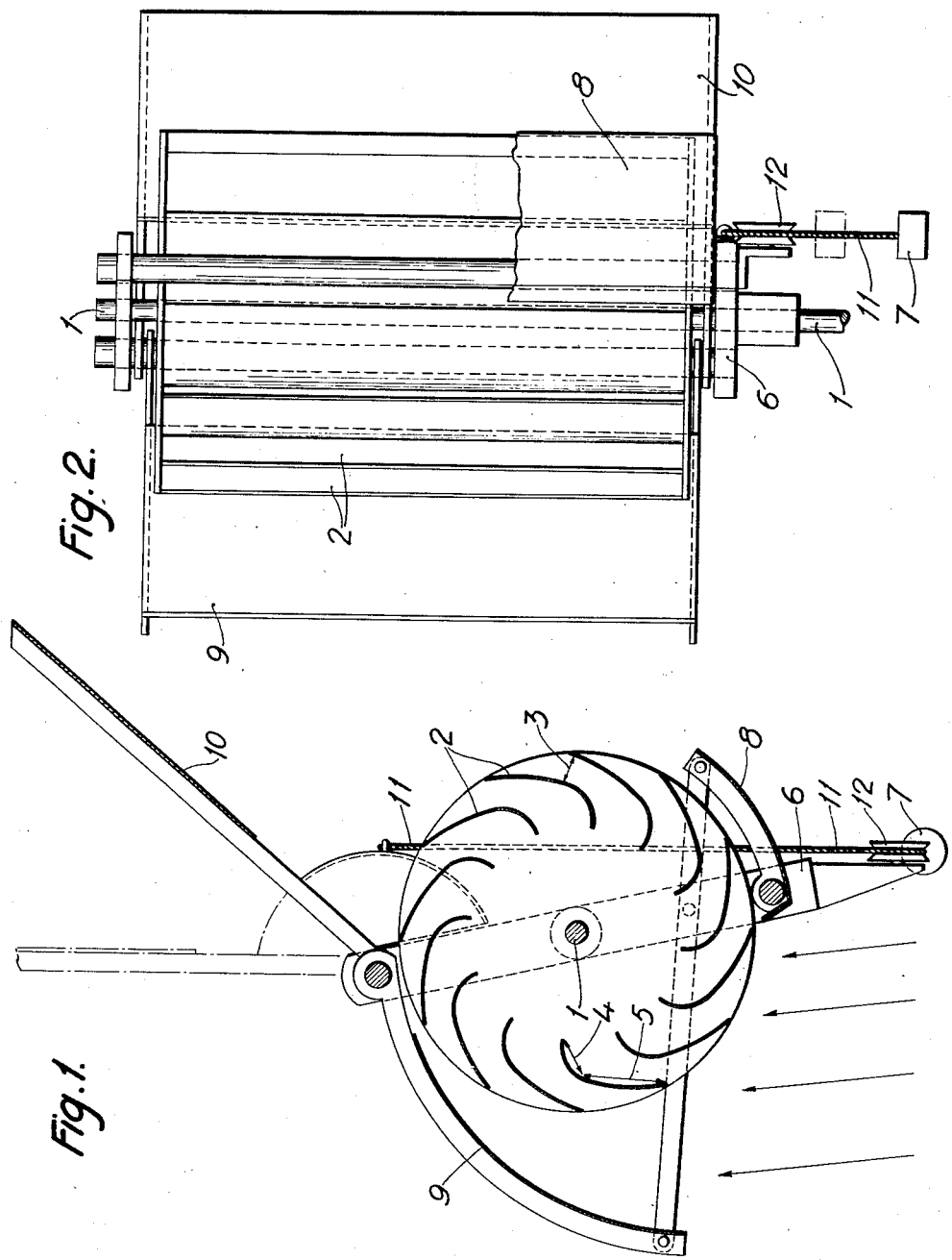
INVENTOR
JOHAN A. JOHANSON
BY Norris & Bateman
ATTORNEYS Patented Aug. 8, 1939

2,169,149

UNITED STATES PATENT OFFICE 2,169,149

DOUBLE-ACTING WIND TURBINE

Johan Alfred Johanson, Stockholm, Sweden

Application June 11, 1938, Serial No. 213,273
In Sweden December 29, 1934

3 Claims. (Cl. 170—17)

The present invention relates to wind motors and this application is a continuation in part of my application filed February 4, 1936, Serial No. 62,362.

The old wind turbines are usually provided with blades or vanes which have a more or less perpendicular position to the direction of the wind, in order to receive the pressure of the wind. There are also wind turbines which are provided with guide rails for leading the wind more perpendicularly against the blades of the motor-wheel. Such devices involve a great drawback as the positively guided direction of the wind removes a great part of the force of the wind, and they are rather complicated and expensive.

This invention relates to a wind turbine which differs from the known constructions by the special position and shape of the blades. The turbine, which is an empty cylinder, is composed of two preferably circular end plates, and of blades attached between said end plates. The blades are obliquely positioned and form an outer rim, there being a void space inside the blades. The arrangement is such that the wind can flow into the openings between the blades and act upon the same with its full force, the wind then entering the inner void space. Due to the pressure arising in this space the air will be pressed out on the other side of the turbine and there for the second time acts with its full force on the blades provided there, so that the turbine will be double-acting by the air being allowed to pass through the blades two times.

My Patent No. 1,502,433 of July 22, 1924, is based on the action of the wind only from the outside, by which more force towards the centre is obtained than in other turbines, but here the wind is allowed to act first from the outside towards the centre and then from the centre towards the lee side. By the wind being allowed to pass through and actuate the blades of the cylinder two times both when entering and leaving the cylinder, and by the wind simultaneously pressing on all blades in the same direction of rotation, an unexpectedly great force of the wind is obtained, indeed double the force obtained in other wind turbines having the same area relatively to the wind.

An embodiment of the invention is illustrated in the accompanying drawing, in which:

Figure 1 is a plan section of the turbine, seen from above with the upper end plate and guide frame removed, and Figure 2 is a front view in the direction of the wind, a screen provided there being partly broken away.

As already mentioned, the turbine is composed of two circular end plates, which are located on a central shaft 1, the blades 2 being provided between the end plates. The number of blades should be twelve, because it has been found that if more than twelve blades are used, the wind is prevented from entering between the blades, and if less than twelve blades are used, the wind has no opportunity of acting with its full force on the lee side.

The position of the blades in the turbine as well as the shape of the blades is of great importance, in order to obtain a good effect. It has been found, that the best result is obtained if the blades have such an oblique position that the approximate perpendicular distance 3 between two blades is about 22% of the radius of the turbine. Due to the fact that the blades are to receive the full force of the wind two times in the same cylinder, or from the outside, and from the inside their shape or curvature must be dimensioned exactly in conformity therewith.

The whole width of each blade is about 75% of the radius of the cylinder. The outer part 5 which constitutes about ⅔ of the blade, is curved with the same radius as that of the cylinder, whereas the inner part 4 which constitutes about ⅓ of the blade, has a radius which is about ⅕ of that of the cylinder.

Due to this particular shape of these two different curvatures of the blades, which thorough tests have proved to be most suitable and due to the angular position of the blades in the cylinder viewed from the periphery the wind is first allowed to act upon the curvature 5 of the blade, and then the wind passes along the curvature 4 over the centre to the other side of the cylinder, the curvature 4 serving again to catch the wind from the centre, the wind getting a second opportunity of acting with all its force on the curvature 5 of the blade. The angular position of the blades in the cylinder is such that the blade rim occupies about 40% of the radius of the cylinder, and a void space of about 60% remains in the centre as otherwise the wind would be checked or choked in the centre and not in the outlet openings on the less side, and not have full force. If the void space be completely filled only a fraction of the force would be obtained.

In the operation the wind in entering the turbine first strikes the concave surfaces of the blades so as to turn the turbine shown in Fig. 1 in a clockwise direction. The current of air in passing out of the turbine also strikes the concave surfaces of the blades to further impart a turning of the turbine in a clockwise direction.

The turbine is mounted in a suitable frame 6 which is movable around the shaft 1 and controlled by a weight 7 which through a rope 11 running over a pulley is connected to a vane 10. The turbine is also provided with a screen 8 and a guide member 9. The vane 10 is pivotally mounted on a part of the frame 6 so that the screen 8 is moved by the frame to deflect the wind from the turbine. Through these devices an automatic control of the turbine according to the direction of the wind and the velocity of the wind is obtained. If the weight is of such a size that it can hold the weather-vane relatively to a certain velocity of the wind, and should eddy-winds having a greater velocity arise the speed of the turbine will not be increased since the weight is then lifted by the vane and the frame is turned so that the screen 8 partly prevents the advance of the wind. By detaching the weight 7 the turbine can be brought to a standstill by the frame being turned so that the screen 8 shuts off most of the wind from the turbine.

Having now described my invention, what I claim as new and desire to secure by Letters Patent is:

1. A double-acting wind turbine comprising a shaft, end plates carried by the shaft, a plurality of blades circumferentially spaced around the shaft and extending axially between the end plates, each blade having an inner and an outer curved portion, the outer curved portion extending over approximately two-thirds of the width of each blade and having substantially the same radius of curvature as the radius of the turbine, the inner curved portion extending over the remaining one-third of the width of each blade and having a radius of curvature approximately equal to one-fifth of the radius of the turbine, the entire width of each blade being about seventy-five percent of the radius of the turbine.

2. A double-acting wind turbine comprising a shaft, end plates carried by the shaft, a plurality of blades circumferentially spaced around the shaft and extending axially between the end plates, each blade having an inner and an outer curved portion, the outer curved portion extending over approximately two-thirds of the width of each blade and having substantially the same radius of curvature as the radius of the turbine, the inner curved portion extending over the remaining one-third of the width of each blade and having a radius of curvature approximately equal to one-fifth of the radius of the turbine, the entire width of each blade being about seventy-five percent of the radius of the turbine, and said blades being angularly arranged forming a rim with the radial width thereof equal to about forty percent of the radius of the turbine.

3. A double-acting wind turbine comprising a shaft, end plates carried by the shaft, a plurality of blades circumferentially spaced around the shaft and extending axially between the end plates, each blade having an inner and an outer curved portion, the outer curved portion extending over approximately two-thirds of the width of each blade and having substantially the same radius of curvature as the radius of the turbine, the inner curved portion extending over the remaining one-third of the width of each blade and having a radius of curvature approximately equal to one-fifth of the radius of the turbine, the entire width of each blade being about seventy-five percent of the radius of the turbine, said blades being angularly arranged forming a rim with the radial width thereof equal to about forty percent of the radius of the turbine, a frame supported on said shaft, a weather vane pivotally mounted on said frame, a wind screen connected to the frame so as to be moved by the weather vane for controlling the air admitted to the turbine.

JOHAN ALFRED JOHANSON.